E. H. ROGERS.
Cotton-Hoe.

No. 209,923.  Patented Nov. 12, 1878.

WITNESSES:

INVENTOR:
E. H. Rogers

BY

ATTORNEYS.

N. PETERS, PHOTO-LITHOGRAPHER, WASHINGTON, D. C.

UNITED STATES PATENT OFFICE.

EELBERT H. ROGERS, OF BOLEY SPRINGS, ASSIGNOR OF ONE-HALF HIS RIGHT TO WILEY DAVIS, OF FAYETTE COUNTY, ALABAMA.

IMPROVEMENT IN COTTON-HOES.

Specification forming part of Letters Patent No. 209,923, dated November 12, 1878; application filed June 14, 1878.

*To all whom it may concern:*

Be it known that I, EELBERT H. ROGERS, of Boley Springs, in the county of Fayette and State of Alabama, have invented a new and Improved Cotton-Hoe; and I do hereby declare that the following is a full, clear, and exact description of the same, reference being had to the accompanying drawing, forming part of this specification, in which—

Figure 1:
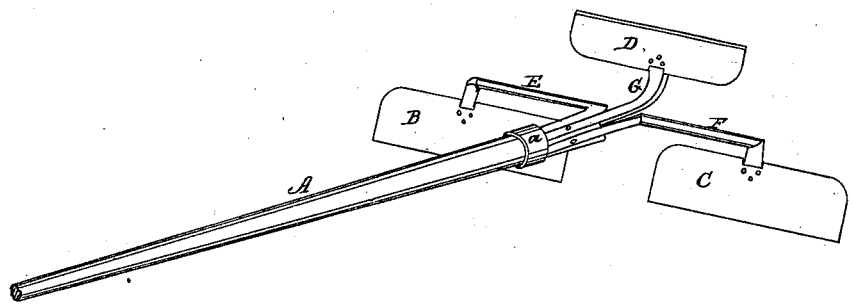
Figure 2:

Figure 1 is a perspective view. Fig. 2 is a cross-section through the handle and tangs.

The object of my invention is to furnish an improvement in that class of hoes which are used for cultivating and thinning out young cotton-plants, and which shall be very light, durable, and cheap.

It consists in attaching three independent blades to one handle or helve by means of three independent arms.

It furthermore consists in so attaching the blades to the arms and the arms to the helve or handle that if a blade or an arm be broken, it may be replaced without much trouble or expense.

In the drawing, A represents the handle. B C D are three thin steel blades attached to the round arms E F G, which are flattened at their inner ends, and secured in grooves formed in the handle by means of screws or rivets. These arms are further secured to the handle by the iron band or sleeve *a*, which is driven on over them after they have been secured to the handle by screws or rivets. The outer ends of the said arms are flattened so that they can be more securely riveted to the blades. The arms E F are attached to opposite sides of the handle, so as to have the cutting-edges of thin blades on a line with each other, some three or four inches apart. The curved arm G is attached to the handle at right angles to the arms E F, so that when the blades B C are in use the blade D will be pointing upward out of the way, and vice versa.

I am aware that hoes have been made with three blades, and I therefore do not claim, broadly, a hoe with three blades; but

What I claim as new is—

The arms E F G, provided with the blades B C D, in combination with the helve or handle A, band *a*, and fastening screws or rivets, substantially as and for the purpose described.

EELBERT H. ROGERS.

Witnesses:
WILLIAM L. BAKER,
F. A. BAKER.